United States Patent [19]

Chaban

[11] 4,078,850
[45] Mar. 14, 1978

[54] HIGH INTENSITY TRACKING SPOT ILLUMINATION SYSTEM FOR MICROSTEREOSCOPES AND THE LIKE

[75] Inventor: Richard J. Chaban, Northridge, Calif.

[73] Assignee: McBain Instruments, Inc., Chatsworth, Calif.

[21] Appl. No.: 732,032

[22] Filed: Oct. 13, 1976

[51] Int. Cl.² .......................................... G02B 21/22
[52] U.S. Cl. ........................................ 350/36; 350/75; 350/87; 350/138; 350/141; 350/145
[58] Field of Search ..................... 350/36, 75, 87, 90, 350/136, 138, 141, 145

[56] References Cited

U.S. PATENT DOCUMENTS

| | | | |
|---|---|---|---|
| 1,679,661 | 8/1928 | Hugershoff | 350/138 |
| 1,798,396 | 3/1931 | Bauersfeld et al. | 350/138 |
| 3,418,034 | 12/1968 | Ambrose | 350/138 |
| 3,879,107 | 4/1975 | Chaban | 350/138 |

Primary Examiner—John K. Corbin
Assistant Examiner—Matthew W. Koren
Attorney, Agent, or Firm—Perry E. Turner

[57] ABSTRACT

A pair of horizontal rods of fiber optic bundles extend into a light box from external high intensity light sources. Light from the rods is directed upwardly via fixed mirrors, and thence horizontally and vertically to a viewing plate via pairs of mirrors supported in rotatable arms. Secured in the mirror arms are bearings that are rotatable in support plates, the axes of such bearings being coaxial with respective rhomboid arms. The mirror arms are caused to track the movements of the rhomboids, and different arrangements are disclosed for effecting such tracking, including external motors having shafts coupled via gears to the bearings and a servo control network with inputs from potentiometers representing the relative positions of the mirror arms and the rhomboids coaxial thereto, and pulleys and belt arrangement extending between coaxial arms.

8 Claims, 14 Drawing Figures

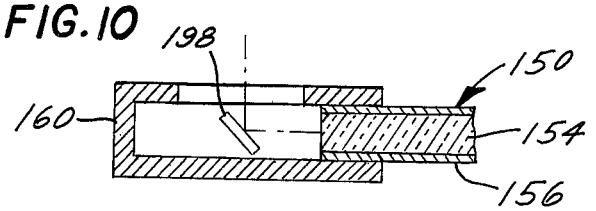
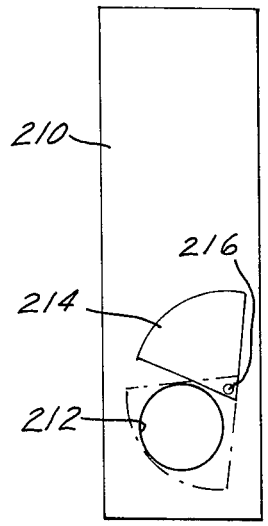
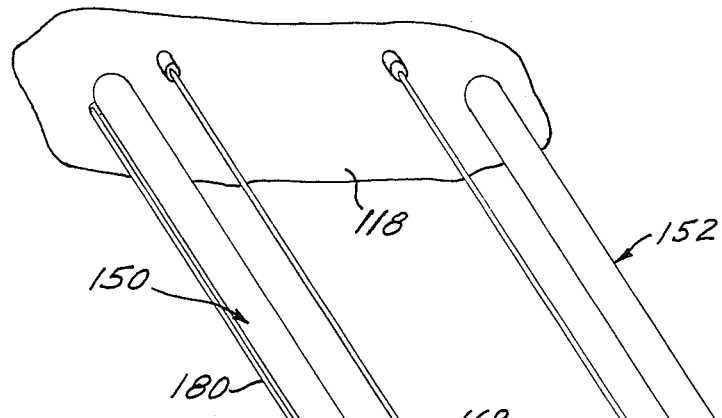
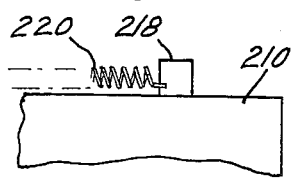
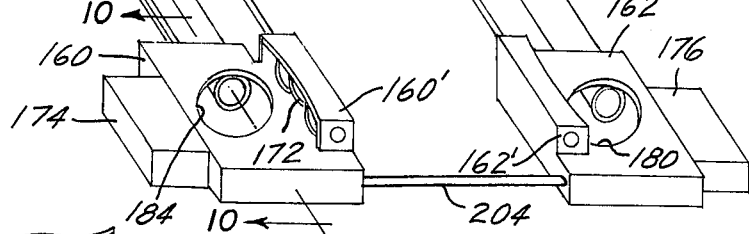
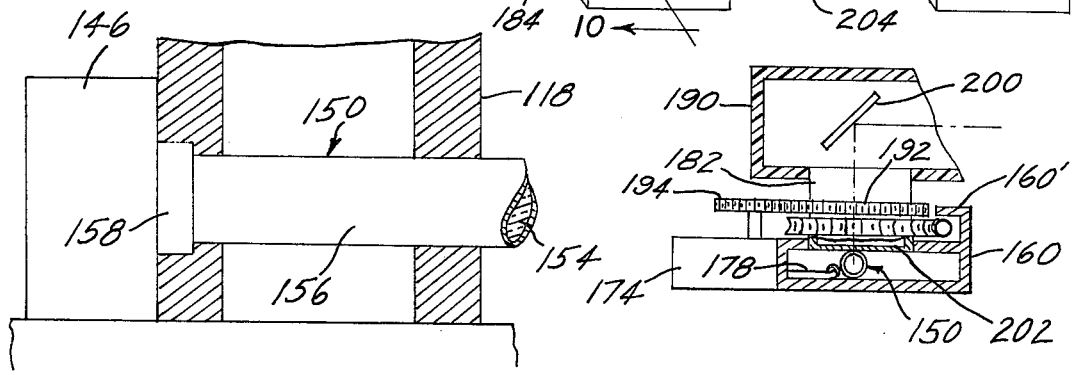

HIGH INTENSITY TRACKING SPOT ILLUMINATION SYSTEM FOR MICROSTEREOSCOPES AND THE LIKE

BACKGROUND OF THE INVENTION

1. Field of the Invention

This invention relates to microstereoscopes and the like, and more particularly to spot illumination systems therefor.

2. Description of the Prior Art

As is well known, a photointerpretation stereoscope is a device having rotatable rhomboid arms for movement over film strips placed on the viewing plate of an interiorly illuminated box. Such illumination, which is from a number of fluorescent lamps, may be of the order of 3,000–5,000 foot lamberts, is sufficient for background lighting for orientation purposes, but is not bright enough for detailed inspection of minute film areas in many instances. For such spot detail work, one needs much higher intensity illumination, e.g., 30,000–50,000 ft. lb.

Considerable time, effort and expense have been devoted to developing means for effecting such high intensity spot illumination via small lamps and structures for rotating them in synchronism with the rhomboid arms. However, such lamps are additional heat sources which require attendant blowers and associated cooling equipment. Such heat sources adjacent the viewing plate are undesirable because of the deleterious efforts of the high temperatures on the glass of the viewing plate and the film placed thereon. Also, vibrations set up by the blowers have the undesirable effect at high power magnification of degrading the images being viewed. Further, such lamps are not readily accessible for replacement purposes, e.g., requiring the viewing plate to be lifted off the light box in order to get to the bulbs.

SUMMARY OF THE INVENTION

This invention embraces a spot illumination system for a light box interior wherein light from a pair of external sources is conducted into the light box via respective rods of optical fibers, and thence upwards to the viewing plate via sets of fixed and movable mirrors. Also embraced is means for rotating the sets of rotatable mirrors in synchronism with the rhomboid arms of a photointerpretation stereoscope so that the highly illuminated spots at the viewing plate are kept aligned with the optical centers of such arms. Heat is thus not introduced into the light box, and vibratory cooling mechanisms are eliminated.

BRIEF DESCRIPTION OF THE DRAWINGS

FIG. 9 is a perspective view of the portion of the vertical support column from which the optical fiber rods and worm gear shafts extend, showing the housing support carried on the end of each rod;

FIG. 10 is a sectional view taken along the line 10—10 of FIG. 9;

FIG. 11 is an enlarged fragmentary sectional view of the lower portion of the vertical support column in which the rods are supported;

FIG. 12 is a fragmentary sectional view of the mounted end of a mirror support arm, showing the gearing and potentiometer carried by the support housing;

FIG. 13 is a top plan view of a mirror support arm provided with a lens to be selectively positioned over the outer opening thereof for providing a high intensity spot of light at the adjacent surface of the viewing plate of the light box; and FIG. 14 is a fragmentary view in elevation of the mirror support arm of FIG. 13, showing the coiled electrical wiring leading from the drive motor for the lens to the exterior of the light box.

DESCRIPTION OF ILLUSTRATIVE EMBODIMENTS

Figure 1:
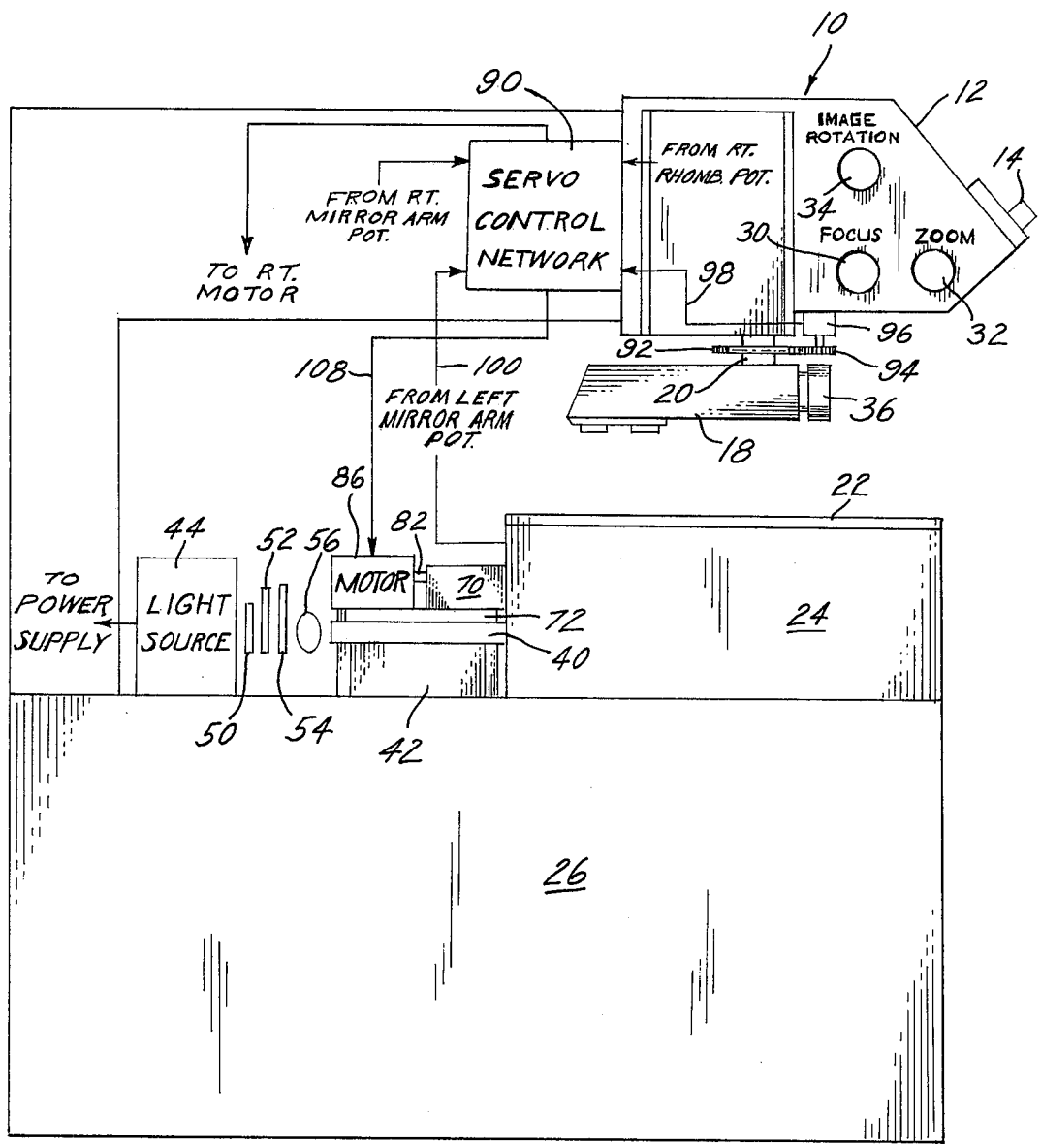
FIG. 1 is a side elevation view of one embodiment of microstereoscope and light box in accordance with this invention, with schematic representations of connections to and from a control network for operating paired arms in synchronism.

Referring to FIG. 1, there is shown a microstereoscope of the type disclosed and claimed in my U.S. Pat. No. 3,879,107 issued Apr. 22, 1975 for "Microstereoscope," assigned to the same assignee as the present application, and to which reference may be made for an understanding of details thereof. The microstereoscope has a housing 10 with a front wall 12 in which eyepieces 14 are mounted. Side members 16 are provided from which rhomboid arms 18 are supported and can be individually selectively adjusted vertically to compensate for variations in thickness or evenness of films being viewed. The rhomboids are also adapted for rotation, being mounted on the lower ends of tubes 20 extending up into the side members 16.

The films to be viewed are placed on the viewing plate 22 of a light box 24 that is supported on a base 26. Mechanism (not shown) is desirably employed for moving the light box 24 horizontally as needed after the films are appropriately positioned on the viewing plate 22. The viewing plate is illuminated via lighting within the box, and stereoscopic viewing is effected of images on the optical centers of the rhomboids. Focus control knobs 30, zoom control knobs 32, and image control knobs 34 are provided for those functions named. Motors 36 preferably are provided on the rhomboids for operating the zoom lenses therein.

Figure 4:
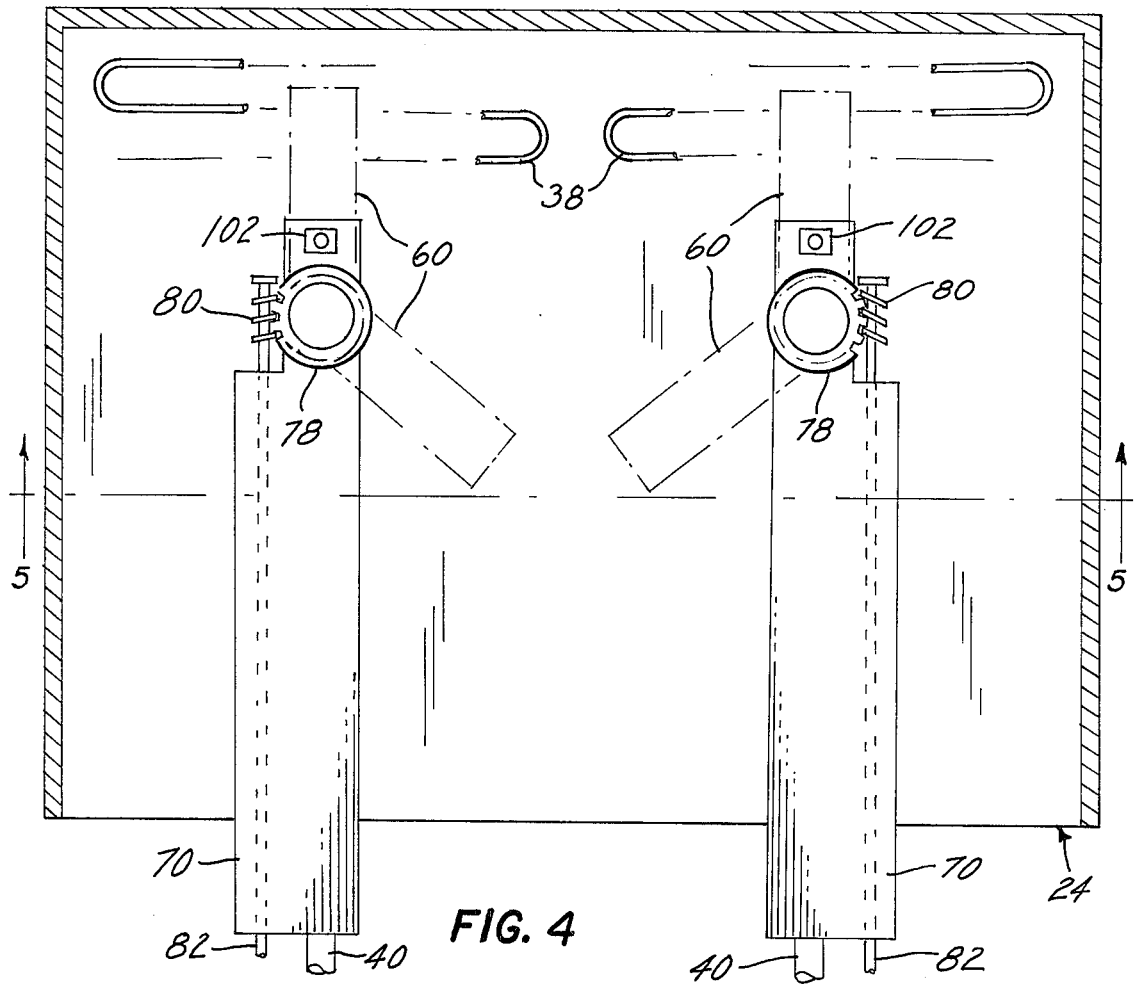
FIG. 4 is a sectional view taken along line 4—4 of FIG. 3.

The light box 24 is shown in FIG. 4 to have fluorescent lamps 38 mounted on its floor to provide the usual interior illumination. As previously indicated, such illumination is utilized for orientation purposes in positioning film strips on the viewing plate, but is inadequate for careful inspection of film images.

Figure 2:
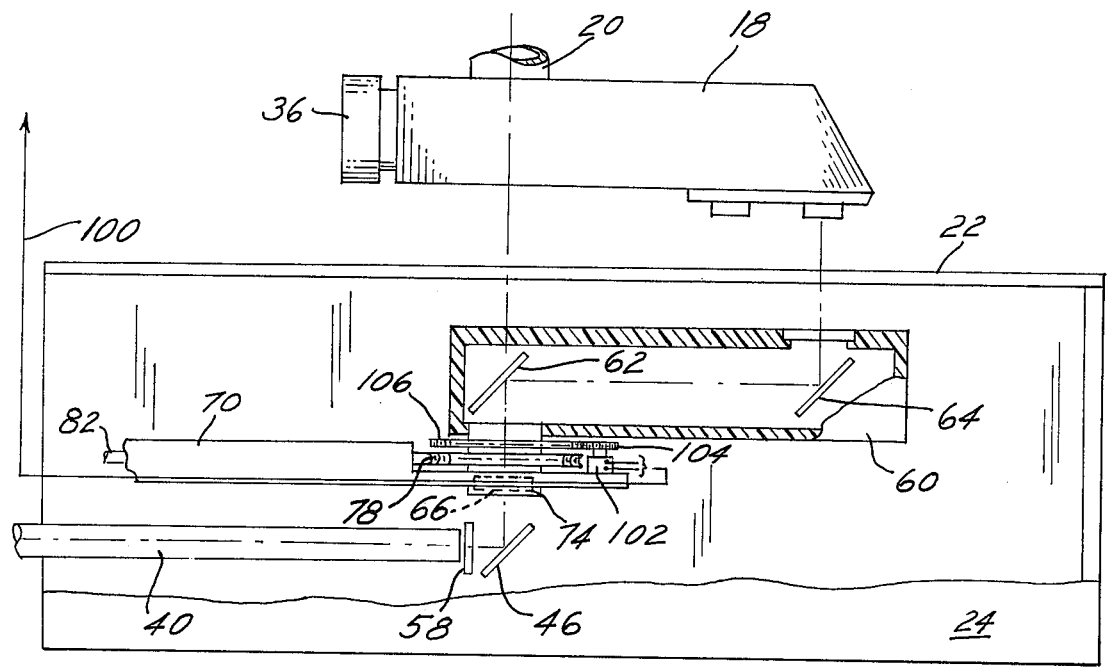
FIG. 2 is a side elevation view of the light box of FIG. 1 broken away to show the relations of the parts therein for one position of the associated rhomboid arm.
Figure 3:
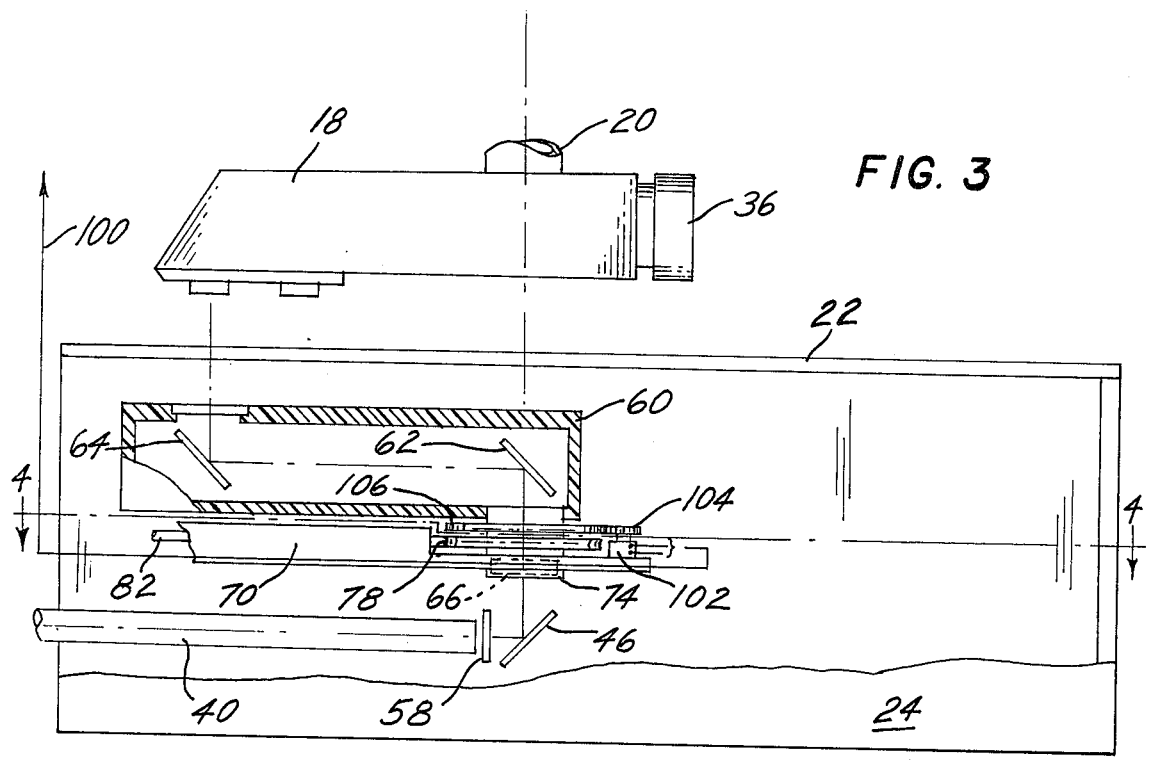
FIG. 3 is a side elevation view like FIG. 2, showing the positions of the parts in the light box for the position of the associated rhomboid arm 180° from the position shown in FIG. 2.

Referring to FIGS. 1-3, a spot of high illumination is directed to the viewing plate on the optical center of each rhomboid arm, such light being conducted into the interior of the light box via a rod 40 of optical fibers. Preferably, the rod 40 is a rigid one for structural stability. Each such rod 40 is mounted on an external support 42, and extends between an external high intensity light source 44 and a stationary mirror 46 inside the light box. Located between the light source 44 and the adjacent end of the rod 40 are filters 50, 52, 54 and a convergent lens 56. The filter 50 preferably is a heat filter, and the filters 52, 54 are light variable output filters. Inside the light box, a light integrator 58 is located between the inner end of the rod 40 and the stationary mirror 46. Thus, the light from the source 44 is concentrated in the rod 40 and caused to pass vertically via the mirror 46. In this latter regard, the mirror 46 is shown to be fixed at a 45° angle.

For the purposes of this invention, the rod 40 may be a bundle of coherent or incoherent fibers. Also, it will be understood that the mirror 46, filters 50, 52, 54, lens 56 and integrator 58 are supported by means (not shown) suitable to retain them in their positions.

Rotatable above the mirror 46 is a mirror support arm 60 in the form of an elongated housing that is rotatable on the same axis as the rhomboid arm with which the respective optical fiber rod 40 is associated. Each mirror arm 60 contains a pair of mirrors 62, 64 fixed therein for directing light from the mirror 46 to the viewing plate 22 and on the optical center of the rhomboid arm 18. Thus, the mirror 62 deflects the light from the mirror 46 along the horizontal, and the mirror 64 deflects the light vertically to the viewing plate. Collection lenses 66 are located between the mirrors 44 and mirror arms 60, for gathering or collimating the light passing into the arms 60.

The intensely bright spot thus presented at the viewing plate 22 readily permits the desired perception and analyses of film images located on the optical axes of the rhomboids. Since the high intensity light source is outside the light box, there is no need for the bulk and expense of blowers, heat sinks and the like for cooling the interior of such a box; bulbs for the light source can easily be changed; and the light projected onto the viewing plate is a cool light which has no deleterious effect on the viewing plate or films placed thereon.

Figure 5:
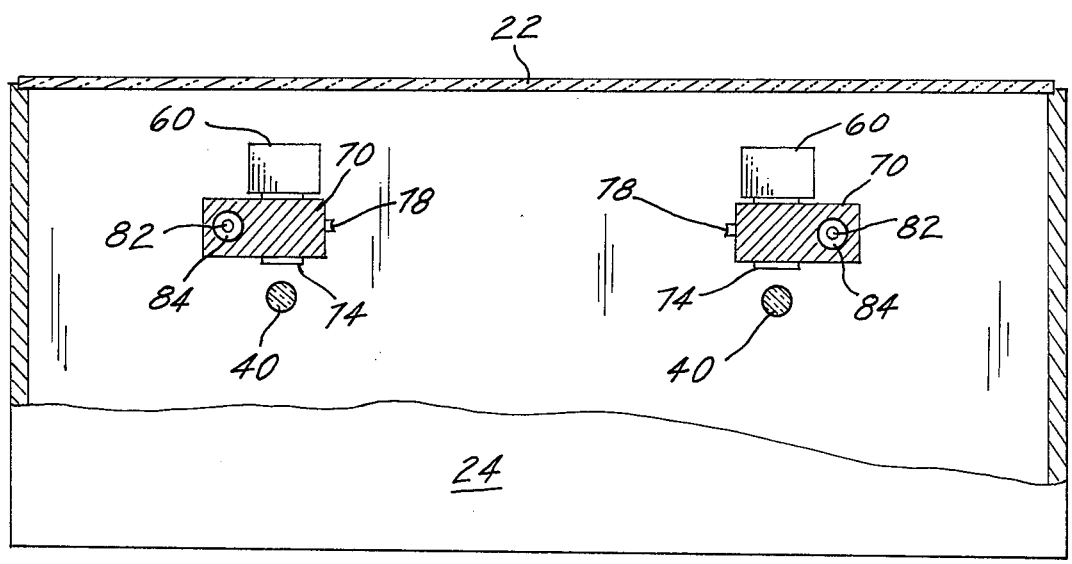
FIG. 5 is a sectional view taken along line 5—5 of FIG. 4.

The mirror arms 60 are rotated in synchronism with the rhomboids 18 so as to maintain light leaving the mirror arms on the optical centers of the rhomboids. To this end, and referring to FIGS. 1-3, each mirror arm 60 is rotatably supported by a plate 70 that is mounted on an external support 72. The plate 70 extends into the light box 24, and a bearing 74 is rotatably mounted at its lower end in the plate 70 and secured at its upper end in the lower opening in the mirror arm 60. It will be noted that the collection lens 66 is mounted in the bearing. For effecting rotation of the mirror arm 60, a worm gear 78 is fixed to the bearing 74. Referring to FIGS. 4 and 5 along with FIGS. 1-3, respective worms 80 meshing with the gears 78 are carried on the ends of shafts 82 that extend through the plates 70, such shafts being rotatable in bearings 84 (FIG. 5) spaced along the openings through which the shafts extend. Motors 86 (FIG. 1) for operating the shafts 82 thus effect angular movements of the respective mirror arms 60.

Each motor is operated via a servo control network 90 (FIG. 1) to effect movement of its mirror arm 60 in synchronism with movements of its rhomboid 18. As shown in FIG. 1, the tube or sleeve 20 via which the rhomboid is rotated has a gear 92 fixed thereto, such gear being in mesh with a gear 94. The gear 94 is secured to the rotatable shaft of a potentiometer 96 that is mounted on the bottom of the housing 10. The potentiometer 96 is shown schematically as connected to the servo control network 90, such connection being represented at 98.

Also shown schematically at 100 in FIGS. 1-3 is a connection to the servo control network from a mirror arm potentiometer. Such potentiometer is shown at 102 in FIGS. 2 and 3 to be mounted on the inner end of the bar 70. As with the potentiometer 96, the potentiometer 102 has a gear 104 secured to the shaft thereof. The gear 104 is in mesh with a gear 106 secured to the bearing 74.

As shown in FIG. 1, the servo control network 90 has an output connection 108 to the motor 86. Such control network is the null-seeking type. In such a closed loop servo system, when an operator grasps the rhomboid 18 and moves it through an arc, movement of the sliding contact of the potentiometer 96 is effected via gearing 92, 94 to establish and out-of-null condition between input and output. The network 90 responds to such condition to provide an output to operate the motor 86 so as to maintain a null. Thus, the gearing 104, 106 (FIGS. 2 and 3) operated from the motor shaft 82 and worm gearing 78, 80 causes the mirror arm 60 to faithfully follow the movements of the associated rhomboid 18.

Figures 6, 7, 8:
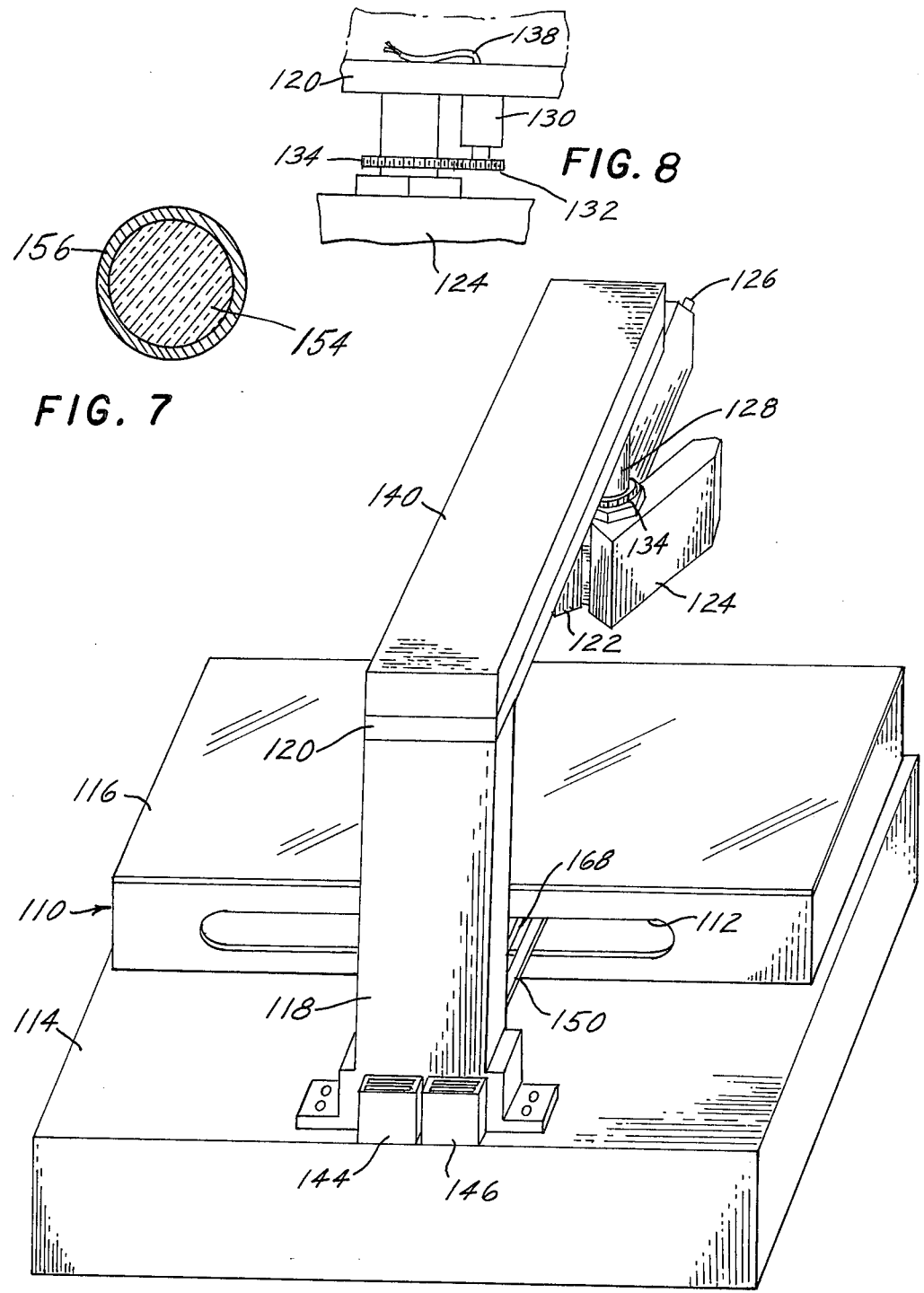
FIG. 6 is a perspective view of another embodiment of microstereoscope and light box in accordance with the invention, wherein the rods of optical fibers are carried in metal tubes which also support the associated mirrors, mirror arms, gearing and potentiometers.
FIG. 7 is a sectional view of a rod of optical fibers in a metal tube as employed in the embodiment shown in FIG. 6.
FIG. 8 is an elevation view of portions of a rhomboid arm and cantilever support beam of the embodiment of FIG. 6, showing the arrangement for operating a potentiometer from the arm.

Referring to FIG. 6, in another embodiment of this invention a light box 110 has an elongated slot 112 in its rear wall, such light box being supported by a base 114 for movements in the horizontal as desired for viewing images on films placed on the viewing plate 116. The microstereoscope in this arrangement is one in which a pillar 118 is secured to the rear portion of the base 114, and a rigid bar 120 is secured at one end to the top of the pillar. The bar 120 supports rhomboid arms 122, 124 and eyepieces 126. As shown for the rhomboid 124, and referring to FIG. 8 with FIG. 7, the arms are rotatable on bearing sleeves 128 that are rotatable in the bar 120.

Also, a potentiometer 130 is secured to the lower surface of the bar 120, and its shaft has a gear 132 secured thereto that is meshed with a gear 134 secured to the sleeve 128. Wiring 138 from the potentiometer 130 extends along the top of the bar 120 to the pillar 118, through which connections are led to the servo control system. Such servo control system will be understood to be as schematically illustrated in FIG. 1, and may be packaged in a console (not shown) mounted on or adjacent to the rear portion of the base 114. Thus, when the rhomboid is subjected to angular movement, the corresponding electrical input to the control network reflects the extent of such movement. A cap 140 on the bar covers such wiring and zoom motor control connections. For causing high illumination spots to be maintained on the optical center lines of the rhomboids at the viewing plate, the pillar 118 at its lower portion supports optical fiber rods and has openings therein through which to direct light from high intensity sources 144, 146 to such rods.

FIG. 9 shows two such rods 150, 152 extending from the front of the pillar 118. FIG. 11 shows one rod 150 extending through the pillar and supported in spaced openings therein. The rods thus positioned are firmly seated, as by snug or frictional fit with the openings in the pillar. In this latter regard, the construction of each such rod is of a rod 154 of optical fibers encased in a metal sheath or sleeve 156 (see FIG. 7), which may be stainless steel or any metallic or non-metallic material that has sufficient structural strength to support the mirror arms, gearing and potentiometers contained within the light box. Further, the filters and lens positioned between the associated light source and rod are suitably packaged and located in the pillar, as at 158 in a recessed opening in the pillar adjacent the light source 146.

With reference to FIGS. 9, 10 and 12, the inner ends of the rods 150, 152 extend into respective housings 160, 162, as through openings in which the rods frictionally engage the housings. The housings 160, 162 have worm compartments extending above their upper surfaces, such compartments being shown at 160', 162', and shafts 168, 170 from motors (not shown) extend from the pillar 118 to the worm compartments in which worms 172 secured to the ends of the shafts are rotatable.

Also, potentiometers 174, 176 are secured to the sides of the housings 160, 162 at the edges opposite the worm compartments 160', 162'. As shown for the potentiometer 174 in FIG. 12, wiring 178 from the potentiometer extends into the bottom of the housing 160, and through the back wall of such housing adjacent the optical fiber rod 150. Preferably, such wiring is connected to the servo control network via a tube 180 (FIG. 9) that extends to the pillar 118 alongside the rod 150.

Again referring to FIG. 12, a sleeve bearing 182 is rotatable in each of the housings 160, 162, being positioned at their lower ends in openings 184, 186 in the upper walls of such housings. A worm gear 188 is secured to each bearing for operation by the worm 172. The upper end of the bearing 182 is secured in the lower opening of a mirror support arm 190, whereby rotation of the worm gear effects rotation of the mirror arm 190. Also fixed to the bearing 182 is a gear 192 that is in mesh with a gear 194 that is fixed to the shaft of the potentiometer 174, such arrangement being like that of gearing previously described for the embodiment of FIGS. 1-5. In like manner, light from the inner end of the rod 150 is directed vertically via a fixed mirror 196 (see FIG. 10) in the housing 160, and horizontally via spaced mirrors in the mirror arm 190, one of such mirrors being shown at 200. Note the rhomboid and mirror arm gear sets are in 1:1 ratio.

Also, FIG. 12 shows a desirable arrangement for utilizing available space to maintain compactness of parts, including the positioning of diffuser and lens means 202 in the upper portion of the housing 160, as in the lower end of the bearing 182. Thus, the diffuser and lens 202 may rotate with the bearing, and hence the mirror arm 190. If desired, of course, a diffuser may be secured in fixed position between the inner end of the rod 150 and the mirror 198 fixed in the interior of the housing 160, i.e., as for the diffuser illustrated for the embodiment of FIGS. 1-5.

It will be noted that with gearing and mirror arm parts as shown in FIG. 12 mounted on the housings 160, 162 of FIG. 9, the optical fiber rods 150, 152 provide all needed supports and eliminate the need for the bars used in the previous embodiment for the motor shafts and the sets of gears for each mirror arm structure. Preferably, the housings 160, 162 are rigidly connected, as by a rigid rod member 204 shown in FIG. 9, so as to avoid relative lateral movements of such housings and the parts associated with them.

FIGS. 13 and 14 illustrate an arrangement for selective positioning of a lens of concentrating light from a mirror arm into a smaller spot at the viewing plate. FIG. 13 shows the top wall 210 of such a mirror arm with the opening 212 at one end through which light is directed to the viewing plate. A sector shaped member 214 is fixed to a rotatable shaft 216 of a motor 218 (FIG. 14) from which a retractable wiring cord 220 extends. Such cord may be led directly along the bottom of the viewing plate and out of the light box to a potentiometer (not shown) for controlling direction of operation of the motor, and hence the positioning of the sector shaped member 214. The member 214 may be a lens or a support having an opening in which a lens is mounted. In either event, the lens diameter preferably equals or spans the opening 212. When such lens is positioned over the opening, as in the phantom position of the member 214 shown in FIG. 13, the light passing through such opening 212 is caused by the lens to be concentrated into a smaller spot than when such lens is removed from the opening as per the solid line position of the member 214. By manual adjustment of the external control, the lens 214 is placed over or removed from the opening 212 as desired.

This invention embraces mechanical drive means for effecting the desired tracking of the mirror arms. Thus, the bearings on which the paired or coaxial rhomboid and mirror arms are mounted may carry pulley wheels, and a belt extended through the back of the light box and around such wheels. Desirably, in such arrangement there are vertically spaced idler pulleys, e.g., two pairs of idlers rotatable on horizontal axes, around which to pass the belt portions or either side of the horizontal pulley wheels. In such arrangement, rotation of the rhomboid effects simultaneous rotation of the mirror arm, and hence achieves the desired tracking mechanically.

I claim:

1. In combination with a microstereoscope or the like having a pair of rhomboid arms rotatable on respective axes and having optical centers along which to view film images on a viewing plate of a light box, wherein the light box has a rear opening, spot illumination means for tracking rotational movements of the rhomboid arms comprising:

a pair of horizontal rods of optical fibers extending into the rear opening of the light box;

respective high intensity light sources adjacent the outer ends of said rods externally of the light box;

respective stationary mirrors adjacent the inner ends of said rods and operable to direct the light therefrom vertically;

a pair of hollow mirror arms containing spaced mirrors fixed therein for directing light from said stationary mirrors horizontally and thence vertically onto the viewing plate, said mirror arms being rotatable on the respective axes of the rhomboid arms;

and means coupling each mirror arm to a respective rhomboid arm and operable to move the mirror arm in synchronism with the associated rhomboid arm.

2. The combination of claim 1, including collection lens means positioned between each stationary mirror and the associated mirror arm.

3. The combination of claim 1, including respective motor means for rotating said mirror arms, and wherein the coupling means includes position sensing means operable by the respective rhomboid arms and mirror arms; and servo control means having inputs from said position sensing means and outputs to said motor means, said servo control means being responsive to said inputs to operate said motor means for effecting movement of said mirror arms in synchronism with the rhomboid arms so as to maintain the light from said mirror arms at the positions on the viewing plate along the optical centers of the rhomboid arms.

4. The combination of claim 3, wherein the position sensing means are respective potentiometers, each potentiometer having a shaft with a gear fixed thereon;

respective gears in mesh with the gears of said potentiometers and rotatable with the rhomboid arms and mirror arms.

5. The combination of claim 4, wherein, for the meshed gears of the potentiometers operable by the paired rhomboid and mirror arms are in the ratio of 1:1.

6. The combination of claim 3, wherein the motor means are positioned outside the light box and have shafts extending into the light box for operating the mirror arms.

7. The combination of claim 6, wherein respective sleeve bearings are fixed at one end to the mirror arms;

a worm gear on each sleeve bearing;

and respective worms fixed to the inner ends of said shafts and in mesh with said worm gears.

8. The combination of claim 6, wherein said rods support housing members on their inner ends, said housing members rotatably supporting the lower ends of said sleeve bearings, said stationary mirrors being secured in said housings, and said potentiometers operable by said mirror arms being secured to said housings.

* * * * *